United States Patent [19]

Wolfe

[11] Patent Number: 4,886,332
[45] Date of Patent: Dec. 12, 1989

[54] OPTICAL SYSTEMS WITH THIN FILM POLARIZATION ROTATORS AND METHOD FOR FABRICATING SUCH ROTATORS

[75] Inventor: Raymond Wolfe, New Providence, N.J.

[73] Assignee: American Telephone and Telegraph Company, Murray Hill, N.J.

[21] Appl. No.: 109,989

[22] Filed: Oct. 19, 1987

[51] Int. Cl.$^4$ ............................................. G02B 5/30
[52] U.S. Cl. ............................ 350/96.12; 350/96.29; 350/96.34; 350/400; 350/403
[58] Field of Search ............... 350/96.12, 96.13, 96.14, 350/96.15, 96.16, 96.29, 96.34, 400, 403, 405

[56] References Cited

U.S. PATENT DOCUMENTS

| | | | |
|---|---|---|---|
| 4,220,395 | 9/1980 | Wang et al. | 350/96.12 |
| 4,671,621 | 6/1987 | Dillon, Jr. et al. | 350/403 |
| 4,691,983 | 9/1987 | Kobayashi et al. | 350/96.12 |
| 4,737,005 | 4/1988 | Burns et al. | 350/96.15 |
| 4,762,384 | 8/1988 | Hegarty et al. | 350/96.12 |

FOREIGN PATENT DOCUMENTS 58-190904  11/1983  Japan .

OTHER PUBLICATIONS

Yamamoto et al., *IEEE J. of Qu. Electronics*, vol. QE-11, No. 9, Sep. 1975, pp. 729–736, "Characteristics of Optical Guided Modes . . . ".

Polky et al., *J.O.S.A.*, vol. 64, No. 3, Mar. 1974, pp. 274–279, "Metal-Clad Planar Dielectric Waveguide for Integrated Optics".

Tien et al., "Optical Waveguides of Single-Crystal Garnet Films," *Appl. Phys. Lett.*, vol. 21, No. 5, Sep. 1972, pp. 207–209.

Shibukawa et al., "Optical TE-TM Mode Conversion in . . . Garnet Waveguide," *Appl. Optics*, vol. 20, No. 14, Jul. 1981, pp. 2444–2450.

Ando et al., "Growth-Induced Optical Birefringence in . . . Garnet Films," *Jap. J. of Appl. Phys.*, vol. 22, No. 10, Oct. 1983, pp. L618–L620.

*Primary Examiner*—John D. Lee
*Attorney, Agent, or Firm*—Bernard Tiegerman; Martin I. Finston

[57] ABSTRACT

A method for fabricating a polarization rotator which includes a thin film waveguide exhibiting essentially zero linear birefringence in the absence of an externally applied stress, as well as an optical system incorporating said rotator, is disclosed.

13 Claims, 8 Drawing Sheets

OPTICAL SYSTEMS WITH THIN FILM POLARIZATION ROTATORS AND METHOD FOR FABRICATING SUCH ROTATORS

BACKGROUND OF THE INVENTION

1. Field of the Invention

The invention pertains to optical systems, e.g., optical fiber communication systems and optical mass storage devices, which include thin film polarization rotators subject to essentially zero linear birefringence, as well as to methods for fabricating such rotators.

2. Art Background

Optical systems for communicating and storing information are known and are now commercially significant. For example, an optical communication system, as schematically depicted in FIG. 1, typically includes a light source, such as a semiconductor laser, which emits a light signal, e.g., an information-carrying light signal, to an optical fiber which transmits the light signal to a photodetector. An optical mass storage device, as schematically depicted in FIG. 2, typically includes an optical disk which is capable of being, or has been, processed to store information. This information is encoded onto the disk (through processing) as regions of different optical properties, e.g., different optical reflectivity. The disk is read, i.e., the information stored on the disk is detected, by shining light from a light source, e.g., a semiconductor laser, (typically through a beam splitter) onto the disk. The light reflected from the disk is then directed (i.e., reflected by the beam splitter) to a photodetector. Alternatively, the light transmited by the disk is directed to a photodetector.

In a wide variety of optical systems, devices that rotate the polarization of linearly polarized light in the same sense irrespective of traversal direction are advantageously included. In this regard, the frequency and power intensity spectra of the light emitted by the semiconductor lasers employed in optical systems are altered when reflected light impinges upon the lasers. Such alterations are undesirable because they lead to errors in the detected information. Thus, efforts have been made to develop devices, called optical isolators, for isolating the semiconductor lasers from reflected light. An optical isolator based on rotation of linearly polarized light is exemplified, as depicted in FIG. 3, by a bulk magnetic garnet material, e.g., bulk single crystal yttrium iron garnet ($Y_3Fe_5O_{12}$, called YIG) material, positioned between a polarizer and an analyzer. This optical isolator has been proposed for use with optical fiber communication systems operating at a wavelength of about 1.3 $\mu$m because single crystal YIG is substantially transparent (at least 50 percent of the incident light is transmitted) at infrared wavelengths (wavelengths ranging from about 0.8 $\mu$m to about 6 $\mu$m). In operation, a magnet is employed to magnetize the YIG (in the direction of light propgation). Linearly polarized light emitted by a laser and transmitted by the polarizer is directed into the YIG material. Under the influence of the net magnetic moment within the (magnetized) material, the linearly polarized light experiences circular birefringence. (In a bulk material, e.g., bulk single crystal YIG, linearly polarized light may be represented as consisting of right- and left-circularly polarized components. Circular birefringence means the two components see different indices of refraction, resulting in one of these components propagating through the material at a faster speed than the other.) As a consequence, the light remains linearly polarized, but the polarization direction is continuously rotated in either the clockwise or counterclockwise (as viewed in FIG. 3) direction as the light traverses the material. (This phenomenon, commonly referred to as the Faraday Effect or magneto-optical rotation, is described in, for example, the *McGraw Hill Encyclopedia on Science and Technology*, 5th edition, Vol. 5 (McGraw Hill, 1982), p. 314.) If the material is of appropriate dimension, the light is rotated through, for example, 45 degrees and is thus transmitted by an appropriately oriented analyzer. Reflected light transmitted by the analyzer also enters the YIG material and also undergoes a rotation of 45 degrees in the same direction as the light which originally traversed the material. Consequently, reflected light, after traversing the YIG material, is oriented at 90 degrees to the polarizer, and is thus precluded from impinging upon the laser. (The phenomenon by which a magnetized material rotates both forward and backward propagating linearly polarized light by 45 degrees (or an odd multiple of 45 degrees) in the same direction is denoted antireciprocal magneto-optical rotation. Devices which include such materials are referred to an antireciprocal devices.)

A second type of device based on rotation of linearly polarized light is a circulator. When employed, for example, in an optical communication system, such a device efficiently couples light signals from a semiconductor laser into one end of an optical fiber, and allows detection of counterpropagating light signals emanating from the same fiber end. One type of optical circulator (having a configuration suitable for efficiently coupling light into and out of an optical fiber end) is depicted in FIG. 4. This circulator, likek the exemplary isolator, includes bulk single crystal YIG, and also includes a polarization sensitive reflector. In operation, a magnet is used to magnetize the YIG in the direction of light propagation. Linearly polarized light, e.g., horizontally (as viewed in FIG. 4) linearly polarized light, emanating from the optical fiber end, is directed into the magnetized YIG. (The optical fiber is, for example, a polarizing fiber. Alternatively, an appropriately oriented polarizer is positioned between a non-polarizing fiber and the YIG.) If the YIG is of appropriate dimension, the light is rotated through, for example, 45 degrees (in the clockwise direction, as viewed from the fiber in FIG. 4) and is transmitted by the polarization sensitive reflector to a detector. Linearly polarized light emitted by a laser and oriented at, for example, $-45$ degrees (relative to the linearly polarized light emanating from the fiber) is reflected by the polarization sensiive reflector into the magnetized YIG. After propagating through the YIG, this light has been rotated 45 degrees (in the clockwise direction, as viewed from the fiber in FIG. 4), and thus enters the fiber horizontally linearly polarized.

While antireciprocal, light rotating devices based on bulk materials, e.g., single crystal YIG isolators and circulators, are useful, they are bulky (have typicall dimensions of 3 mm by 3 mm by 3 mm), require the application of large magnetic fields (typiccally larger than about 1000 oersteds (Oe)), are expensive (typically costing about 1000 dollars), and are thus not entirely commercially attractive. By contrast, a thin (having a thickness less than about 10 times the wavelength of the incident light) film waveguide antireciprocal device, e.g., a thin film optical isolator or circulator, using planar magnetization would be a much more attractive device. For example, a thin film device would permit the uses of guided wave optics (and thus eliminate the need for focusing lenses, not shown in FIGS. 1–4), require the application of relatively small magnetic fields (smaller than about 100 Oe), and be relatively inexpensive. In addition, it could also serve as a building block for integrated optical devices (an optical device which includes two or more components, performing different functions, and formed on the same substrate) useful in optical systems.

Thin film waveguiding devices employing planar magnetization have, in fact, been fabricated. Such devices have included, for example, a magnetized (in the plane of the film) layer of YIG epitaxially grown on a (closely lattice matched) substrate of, for example, gdolinium gallium garnet ($Gd_3Ga_5O_{12}$, called GGG). While these devices are potenially attractive, they are, unfortunately, subject to lineara birefringence. That is, in a thin film, linearly polarized light may be represented as consising of two orthogonal, linearly polarized components. In one of these components the electric field of the light (an electromagnetic wave) is oriented parallel to the film surface and is denoted the TE component. In the other component, the electric field is oriented perpendicularly to the film surface and is denoted the TM component. Linear birefringence means that the TE and TM components see different refractive indices, resulting in one of these components propagating through the film at a faster speed than the other. (Regarding linear birefringence in thin film waveguides see, e.g., P. K. Tien, App. Opt., Vol. 10, p. 2395 (1971).) Thus, when traversing a magnetized thin film, e.g., a magnetized layer of YIG, light is subjected elliptic birefringence, i.e., a birefringence which includes both a linear component and a circular component. As a consequence, initially linearly polarized light undergoes oscillatory rotation. (The distance traversed by the light in completing one oscillation is called the birefringent period, P.) This oscicllation is depicted in FIG. 5 where the incident light impinges upon a magnetized thin film at an angle of, of example, 0 degrees (to the y-axis). While propagating through the film, the light is initially rotated through a relatively small angle, e.g., 3 degrees, in, for example, the clockwise direction. Further propagaion produces a counterrotation to −3 degrees, and still further propagataion to a distance P results in the light returning to its initial orientation (i.e., parallel to the y-axis). During this oscillatory rotation, the polarization of the light also varies continuously from linear to elliptic to linear. Because the amplitude of the oscillation is constant and, for most materials, small, e.g., 3 or 4 degrees, little or no net rotation is achieved. But, as discussed, an anatireciprocal device must achieve a rotation substantially beyond that normally achieved in linearly birefringent materials, and on exiting, the light should be substantially linearly polarized to avoid, for example, opticcal power loss at the analyzer of an optical isolator. Thus, the effects of linear birefringence in thin film, magnetized, waveguiding devices have presented a serious obstacle to their advantageous use.

The factors responsible for the linear birefringence found in thin films of, for example, YIG have been identified. One of these factors is what is here termed shape linear birefringence, which is due to the presence of discontinuities in refractive index at the film-air and film-substrate interfaces. These discontinuities affect the TM component differently from the way they affect the TE component, producing an effective refractive index anisotropy in the film. Significantly, the magnitude of the shape linear birefringence increases as the the thickness of the film is decreased.

A second factor responsible for linear birefringence, commonly termed stress-induced linear birefringence, is due to a lattice mismatch between the film and the substrate. This mismatch subjects the film to either a compressive or tensile stress in the plane of the film, which also has the effect of inducing a refractive index anisotropy in the film. Generally, the magnitude of the stress-induced linear birefringence is independent of film thickness.

Yet a third factor responsible for linear birefringence, commonly termed growth-induced linear birefringence, is due to a non-uniform distribution of certain ions in the film crystal lattice, produced by the conventional techniques used to epitaxially grow films on substrates. That is, in the case of, for example, YIG films, the Y (yttrium) cation is often partially replaced with one or more different cations, e.g., Bi or Nd, to alater the properties of the films. When such a film is grown on a substrate using conventional techniques, e.g., liquid phase epitaxy (LPE), the resulting distribution of the replacement cations in the direction perpendicular to the plane of the film is often different from the corresponding distribution in the plane of the film. This difference in the cation distribution also gives rise to a refractive index anisotropy. As with the stress-induced linear birefringence, the magnitude of the growth-induced linear birefringence is generally independent of film thickness.

It is known that, in many cases, the sign of the stress-induced and/or growth-induced linear birefringence is opposite to that of the shape linear birefringence. Thus, it has been suggested that these different sources of linear birefringence be used to cancel each other to produce zero net linear birefringence.

Different attempts have been made to implement the above suggestion, and different parameters have been measured to judge the efficacy of the attempts. To permit meaningful comparisons, these attempts are described below with reference to a single, nondimensional parameter $\alpha$ (readily inferable from the different measured parameters), where $$\alpha = \frac{\Delta\beta/2}{K}.$$

Here, $\Delta\beta = 2\pi\cdot\Delta n/\lambda$, where $\Delta n$ denotes the difference in the refractive indices seen by the TE and TM components, while $\lambda$ denotes the wavelengh of the light. Physically, $\Delta\beta$ is the phase difference (induced by the net linear birefringence) between the TE and TM components per unit length of film, and has dimensions of, for example, radians per centimeter. In addition, K denotes the Faraday rotation per unit length of the film, and has identical units to that of $\Delta\beta$. Relatively low values of $\alpha$, i.e., values of $\alpha$ less than or equal to about 0.1, are desirable and imply high efficacy, while values of $\alpha$ greater than about 0.1 are undesirable and imply low efficacy.

In one attempt to achieve zero net linear birefringence,, Nd-doped YIG films were grown on a GGG substrate, the amount of Nd being controlled to control lattice mismatch and thus stress-induced linear birefringence. (See T. Okuda et al, "LPE Growth of YNd-Iron Garnet Films for Magnetooptical Waveguides," *Journal of Magnetism and Magnetic Materials*, Vol. 35 (1983), pp. 164–166.) To determine the effects of film thickness, these films were etched to smaller and smaller thicknesses, and the linear birefringence properties of the films, both prior and subsequent to etching, were measured. Significantly, the unetched films had values of $\alpha$ as low as, but no lower than, about 0.5. After etching, the films exhibited substantially higher values of $\alpha$, with $\alpha$ increasing as film thickness decreased.

In a second attempt to produce zero net linear birefringence, $(BiGdLu)_3(FeGa)_5O_{12}$ films were grown on a GG substrate, and annealed at different temperatures, for different amounts of time. (See K. Ando et al, "Annealing effects on growth-induced optical birefringence in liquid-phase-epitaxial-grown Bi-substituted iron garnet films," *Journal of Applied Physics*, Vol. 57, No. 4, 15 Februaray 1985, pp. 1277–1281). It was found that annealing serves to reduce growth-induced linear birefringence and, in this instance, leads to reduced values of $\alpha$. However, the lowest measured value of $\alpha$ was no lower than 0.14.

Significantly, at least one group of authors (who are presumably familiar with the above attempts) has concluded that tolerances in the manufacturing processes make it impossible to achieve sufficient control over the different sources of linear birefringence to produce films having acceptably low, net linear birefringences. (See H. Dammann et al, "Phase Matching in Symmetrical Single-mode Magneto-optic Waveguides by Application of Stress," *Applied Physics Letters*, Vol. 29, No. 26, 29 December 1986, pp. 1755–1757). Rather, these authors have concluded that the net linear birefringences exhibited by conventionally manufactured films can only be reduced to acceptably low values through the application of an external stress as applied, for example, via a pneumatic table.

Thus, those engaged in the development of optical systems employing thin film, waveguiding, polarization-rotating devices have sought, thus far without success, convenient techniques for reducing the net linear birefringences in these devices to acceptably low levels.

SUMMARY OF THE INVENTION

The invenion involves a method for fabricating a thin film, waveguiding, polarization rotator which achieves essentially zero net linear birefringence, i.e., achieves a value of $\alpha(=\Delta\beta/2K)$ less than or equal to about 0.1 and preferably less than or equal to about 0.05, without an externally applied stress. In accordance with the inventive method, the thin film (of the polarization rotator) is fabricated so as to be subject to one or more components of linear birefringence which are opposite in sign to the shape linear birefringence associated with the film, at the wavelength of the electromagnetic radiation incident upon, and for othe film magnetization direction (or directions, if there is more than one) employed in the operation of, the rotator. Moreover, and in accordance with the inventive method, the magnitude of the shape lineara birefringence is then controllably adjusted until the different components of linear birefringence essentially cancel each other (at the operating wavelength and magnetization direction). That is, in one embodiment of the inventive method, the film is formed with a relatively large (initial) thickness so that the magnitude of the shape linear birefringence is less than the magnitude of the linear birefringence components of opposite sign. Then, the initial thickness of the film is successively reduced (and thus the magnitude of the shape linear birefringence successively increased) using, for example, conventional etching techniques, while monitoring the magnitude of the net linear birefringence, until the different contributions to the net linear birefringence essentially cancel each other. Alternatively, in a second embodiment of the inventive method, the film is initially formed with a relatively small thickness (so that a magnitude of the shape-linear birefringence is greater than that of the linear birefringence components of opposite sign). Then, a layer of material, having a refractive index intermediate that of the film material and the surrounding atmosphere, is deposited onto the film. The thickness of this layer is successively altered, i.e., additional material is successively deposited or the layer is successively etched, until the net linear birefringence is essentially zero.

BRIEF DESCRIPTION OF THE DRAWINGS

The invention is described with reference to the accompanying drawings, wherein.

DETAILED DESCRIPTION

The invention involves a method for fabricating a thin film, waveguiding, polarization rotator which achieves essentially zero net linear birefringence, i.e., achieves a vlaue of $\alpha(=\Delta\beta/2K)$ less than or equal to about 0.1 and preferably less than or equal to about 0.05, without an externally applied stress. The invention also involves an optical ystem, e.g., an optical fiber communication system or ana optical mass storage device, which includes the resulting thin film polarization rotator.

Figure 6:
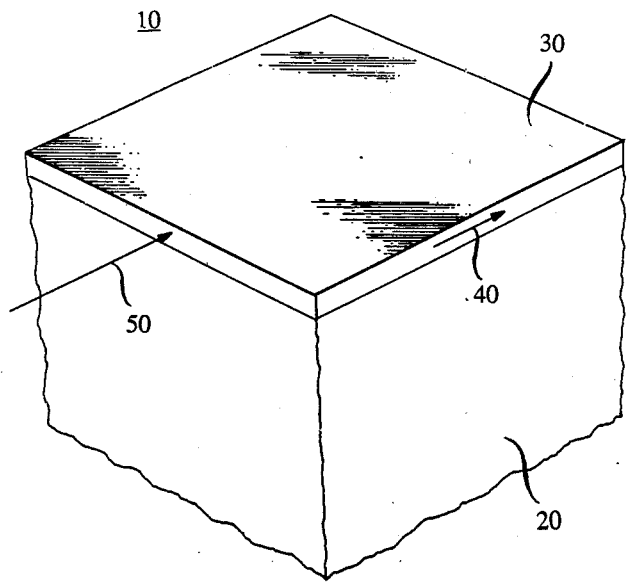
FIGS. 6 and 7 depict thin film polarization rotators encompassed by the present invention.

With reference to FIG. 6, a polarization rotator 10 produced via the inventive method, and employed in the inventive optical system, typiclly includes a substrate 20 of, for example, GGG. The rotator also includes a thin film optical waveguide 30 of magnetic material, e.g., YIG, supported by the substrate 20. (For purposes of the invention, a thin film waveguide is one whose thickness is less than ten times the wavelength of the light incident upon, and guided by, the waveguide.) Significantly, the refractive index of the thin film 30 should be greater than that of the substrate 20 to achieve guiding of light. In the operation of the rotator 10, the thin film waveguide 30 is typically (although not necessarily) unidirectionally magnetized, with at least a component of the magnetization (depicted by the arrow labeled 40) being parallel or antiparallel to the propagation direction within the film 30 of the linearly polarized light (depicted by the arrow labeled 50) incident upon the film. Under the influence of the magnetization component 40, and by virtue of the total, or almost total, absence of linear birefringence (as achieved via the invenive method), the polarization of the incident light is essentially continuously rotated in the clockwise or counterclockwise direction (depending upon whether the magnetization componen 40 is parallel to antiparallel to the propagation direction of the light), as the light propagates through the film, and the light remains essentially linearly polarized.

As discussed above, the inventive fabrication method requires that the thin (magnetic) film 30 of the polarization rotator 10 be fabricated so as to be subject to one or more component of linear birefringence which are opposite in sign to the shape linear birefringence of the film. Moreover, the film 30 should be subject to these components at the wavelength of the linearly polarized light which is to be rotated by, and for the film magnetization direction (or directions, if there is more than one) employed in the operation of, the rotator. Thus, for example, if linear birefringence, $\Delta n$, is defined to be the difference between the refractive indices seen, respectively, by the TE and TM components (rather than the converse), i.e., $\Delta n = n_{TE} - n_{TM}$, then the shape linear birefringence will (necessarily) be positive and one or more other linear birefringence components will have to be negative.

Various techniques are available for forming thin films subject to one or more negative linear birefringences. For example, if the film 30 is a rare earth (or yttrium) iron garnet film epitaxially grown on a crystalline substrate 20, them, as discussed above, the film will be subjected to an internal compressive or tensile stress, which gives rise to a stress-induced linear birefringence, if there is a lattice mismatch between the film and the substrate. (The presence of a lattice mismatch, i.e., a difference in the magnitudes of the film and substrate lattice constants, is readily determined using conventional x-ray diffraction techniques.) Such a lattice mismatch, and the corresponding stress-induced linear birefringence, is produced, for example, by partially replacing the original rare earth (or yttrium) catio with one or more other cations. (If the replacement cation is larger than the original rare earth cation, then the film 30 will be in compression. If he replacement cation is smaller than the original rare earth cation, then the film 30 will be in tension.) Significantly, this stress-induced linear birefringence can be either positive or negative. In general, the sign of the stress-induced linear birefringence must be determined empirically. One useful empirical technique is to subject the film 30 to either a tensile or compressive external stress, e.g., to bend the film, and measure the corresponding change in the net linear birefringence (using techniques described below). That is, if the film 30 is initially in, for example, tension, and if an externally applied tensile stress produces a more negative net linear birefringence, then the (original) stress-induced linear birefringence is negative. By way of example, if Bi (which is a larger cation than Y) is partially substituted for Y in YIG, and if a Bi-doped YIG film is epitaxially grown on GGG, then the resulting film will be in compression and the above empirical technique readily shows that the stress-induced linear birefringence is negative.

As also discussed, the conventional epitaxial film growth techniques, e.g., liquid phase epitaxy, are inherently useful for introducing negative linear birefringence into the film 30. That is, if the film 30 is, for example, a rare earth (or yttrium) iron garnet film in which the original rare earth (or yttrium) cation is partially substituted by one or more other cations, then the conventional epitaxial growth techniques will often introduce growth-induced linear birefringence. However, as with the stressinduced linear birefringence, the growth-induced linear birefringence can be either positive or negative. In general, the sign of this linear birefringence must be determined empirically. A useful empirical technique is to anneal the film 30, which serves to reduce the growth-induced linear birefringence, and then measure (using techniques described below) the corresponding change in the net linear birefringence. That is, if the annealing produces, for example, a more positive net linear birefringence, then the original growth-induced linear birefringence is negative.

The invenive fabrication method is distinguished from previous such methods in that after the film 30 is formed with one or more negative components of linear birefringence, the magnitude of the shape linear birefringence is adjusted until the film 30 exhibits essentially zero net linear birefringence at the wavelength, and for the magnetization direction, employed in the operation of the polarization rotator 10. This is readily achieved, in a first embodiment of the inventive method, by forming the film with a sufficiently large initial thickness so that the magnitude of the negative linear birefringence components is greater than the magnitude of the shape linear birefringence, and therefore the net linear birefringence is initially negative. A film thickness which satisfies this requirement is readily determined through the use of control samples. That is, control sample films of different thickness are initially formed (using idenical techniques). The thinnest control sample (provided it is sufficiently thin, e.g., has a thickness of about 1 micrometer) will necessarily be dominated by positive linear birefringence, i.e., shape linear birefringence. On the other hand, one or more of the thicker control samples will (presumably) be dominated by negative linear birefringence. To determine the film thickness at which the net linear birefringence changes from positive to negative, identically linearly polarized light (of wavelength equal to that to be employed in the operation of the rotator 10) is injected into each control sample, in order of increasing thickness, and the sign of the ellipticity (i.e., whether the ellipticity is right-handed or left-handed) of the exiting light is determined using, for example, a conventional compensator. The control sample thickness at which the ellipticity first changes sign implies that films having this, and larger thicknesses, have a net negative linear birefringence. (This same optical technique is useful in determining changes in the sign of net linear birefringence produced by the application of an external stress, or through annealing.)

The relatively large initial thickness of the film is now successively reduced. That is, the film is repeatedly etched using either wet or dry, e.g., back sputtering or ion milling, etching techniques which leave an optically smooth surface. In the case of, for example, garnet films, a useful wet etchant is phosphoric acid. On the other hand, a useful atmosphere in which to carry out back sputtering or ion milling of a garnet film is argon.

After each thickness reduction, the magnitude of the net linear birefringence is indirectly measured. This is readily achieved by coupling linearly polarized light (of wavelength equal to that of the light to be rotated by the rotator 10) into the film via, for example, a rutile prism, at various positions along the length of the film.

After each such coupling, the orientation of the principal axis of the (generally elliptically polarized) light exiting the film is measured (relative to the polarization orientation of the light coupled into the film). By plotting principal axis orientation as a function of position along the length of the film, the birefringence period, P, corresponding to current film thickness, is readily determined. Significantly, P increases as the magnitude of the net linear birefringece, and thus $\alpha$, decreases, approaching a maximum value of $\pi/K$ as $\alpha$ approaches zero. Unfortunately, near this maximum, P becomes relatively insensitive to changes in film thickness. By contrast, near this maximum, the magnitude of the ellipticity of the exiting light (which also approaches zero as $\alpha$ approaches zero) is sensitive is changes in film thickness, and is thus monitored. That is, once P approaches $\pi/K$, and after each reduction in film thickness, linearly polarized light is injected into one end of the film, and an analyzer is used to determine the principal polarization axis of the light exiting the film, and is thus used to determine the angle, $\phi$, between this principal polarization axis and the polarization direction of the injected light. In addition, the intensity of the exiting light polarized along the principal axis, $I_1$, is measured, as in the intensity of the exiting light which is polarized at an angle of either $-90$ degrees or $-90$ degrees to the principal axis, $I_2$. Then, a parameter $$R = \frac{I_2}{I_1} \sin^2\phi,$$

which is a measure of the magnitude of the ellipticity, is calculated. Significantly, as noted, R decreases as $\alpha$ decreases, and is less than or equal to about 0.01 when $\alpha$ is less than or equal to about 0.1, and is less than or equal to about 0.0025 when $\alpha$ is less than or equala to about 0.05. (In point of fact, measuring the R value associated with a thin film waveguide exhibiting a value of P near $\pi/K$ is a convenient technique for determining whether the waveguide is encompassed by the present invention.) Consequently, etching is stopped when the desired value of R, and thus the desired value of $\alpha$, is reached.

In a second embodiment of the inventive fabrication method, the film 30 is initially formed with a relatively small thickness, so that the film is initially dominated by shape linear birefringence. Then, the effective (not the actual) thickness of the film 30 is increased by depositing a layer of material (not shown in FIG. 6) onto the film 30, having a refractive index intermediate that of the film 30 and the surrounding atmosphere. Useful such materials include, for example, $Si_3N_4$ and $SiO_2$. Now, the thickness of the deposited material is successively altered, e.g., either increased through further deposition or decreased through etching, while monitoring he magnitude of the net linear birefringence, as described above. In this regard, a useful wet etchant for $Si_3N_4$ and $SiO_2$ is HF. In addition, these materials are readily plasma etched in a fluorocarbon atmosphere, e.g., in an atmosphere of $CF_4$.

It should be noted that if the initial film thickness is relatively small, then the ability to reduce the magnitude of the corresponding shape birefringence through deposition of overlying material is limited. For example, if the film 30 is of YIG and has a thickness of 1 micrometer, then depositing $Si_3N_4$ onto the YIG permits a reduction in the magnitude of the shape linear birefringece of no more than about 50 percent.

Figure 7:
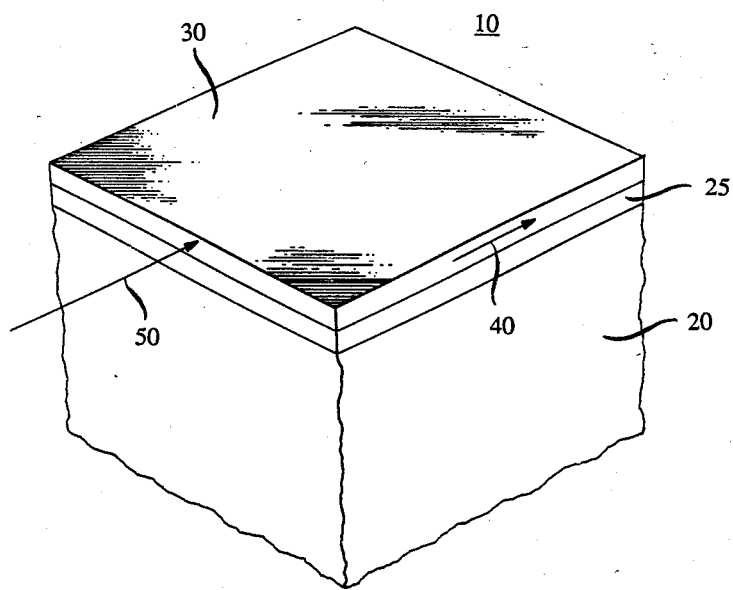

It should also be noted that, in general, the thin film waveguide 30 will typically guide more than one TE mode and more than one TM mode (irrespective of whether the waveguide is fabricated via the first or second embodiment). Bu, the net linear birefringence is readily essentially negated, via the inventive fabrication mode, for only one mode of each type, i.e., for only one TE mode and one TM mode. However, if so desired, the waveguide 30 will guide only one mode of each type if the structure of the polarization rotator 10 is modified in accordance with the teachings of U. S. patent application Ser. No. 771,016 (now U.S. Pat. No. 4,762,384) filed by J. Hegarty and R. Wolfe on Aug. 30, 1985, which is hereby incorporated by reference. In accordance with one aspect of these teachings, and as depicted in FIG. 7, only a single mode of each type is guided by the film 30 provided a layer 25 is interposed between the film 30 and the substrate 20. The refractive index of this interposed layer should be intermediate that of the film 30 and the substrate 20, and preferably be only slightly lower than that of the film 30.

Figure 8:
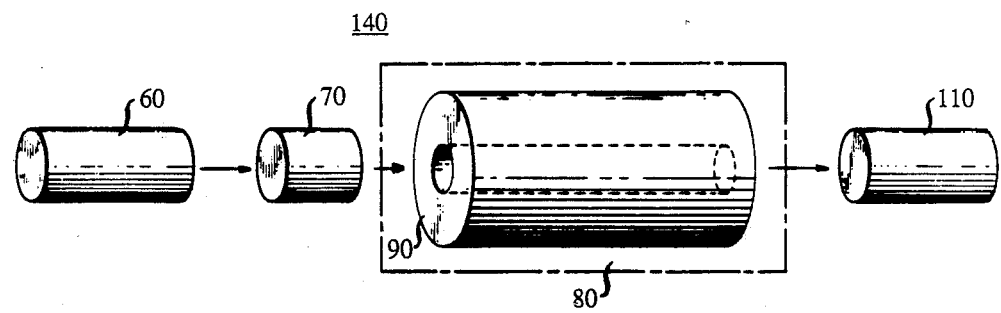
FIGS. 8, 9, 10 and 14 depict optical systems encompassed by the present invention.
Figure 9:
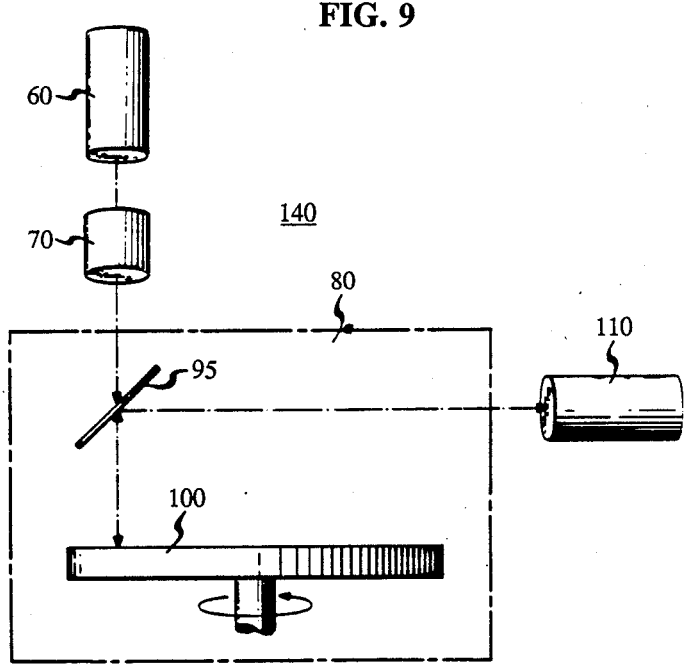

As depicted in FIGS. 8–16, the present invention also encompasses an optical system 140 which incorporates the thin film polarization rotator 10 (fabricated in accordance with the inventive method), for use in any of a variety of capacities, e.g., as a component of an antireciprocal device, of an optical switch or of an optical (intensity) modulator. For example, if the thin film polarization rotator 10 is employed as a component of an anirecciprocal device 70 functioning as, e.g., an optical isolator, then, as depicted in FIGS. 8–9, the inventive optical system 140 includes an optical source 600, e.g., a semiconductor laser. This system also includes a system component 80 impinged upon by light emited by the source 60 and transmitted by the optical isolator 70, as well as a photodetector 110. As shown in FIG. 8, the system component 80 includes, for example, an optical fiber 90. Alternatively, and as shown in FIG. 9, the system componen 80 includes a beam splitter 95 and an optical disk 100.

Figure 10:
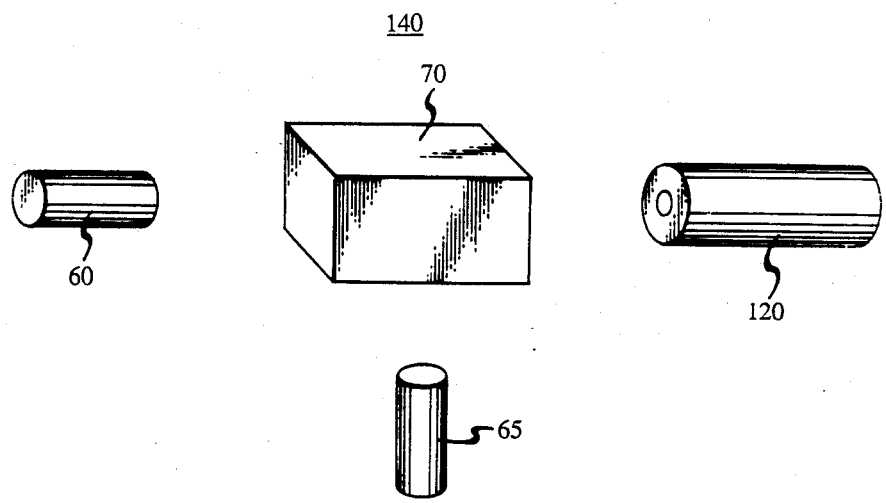

If the antireciprocal device 70 functions, for example, as an optical circulator, then, as depicted in FIG. 10, the system 140 includes an optical source 60 and optical detector 65, as well as an optical fiber 120. Light emitted by the source 60 is coupled into one end of the fiber 120 via the circulator 70. The circulator 70 also serves to couple light emanating from the fiber end into the detector 65. Generally, another optical detector and/or optical source (with or without the circulator 30) are positioned at the opposite end of fiber. (It is assumed that in this embodiment, the optical fiber 120 is, for example, a polarization-preserving fiber. If not, then the system also includes a polarizer between the fiber 120 and the optical circulator.)

Figure 11:
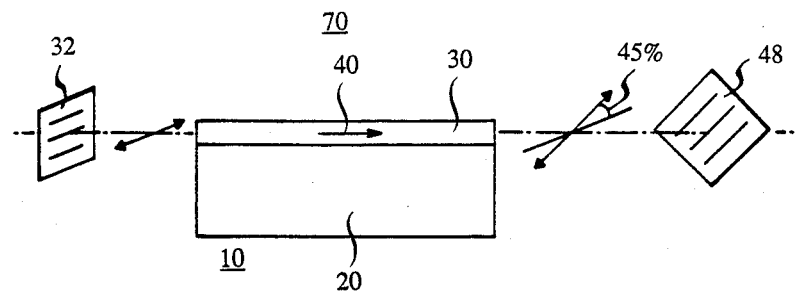
Figure 12:
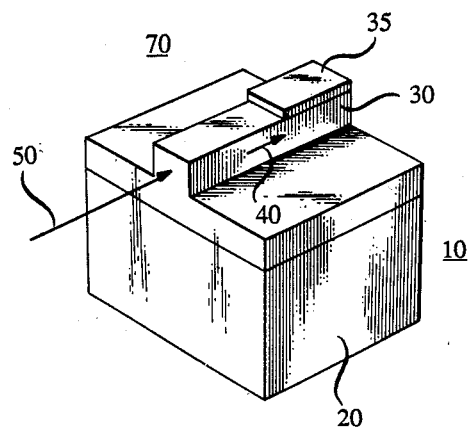

As shown in FIG. 11, if the antireciprocal device 70 is an optical isolator, then the isolator includes the thin film polarization rotator 10 positioned between a polarizer 32 and an analyzer 48. (The length of the rotator 10 is chosen to achieve a polarization rotation of 45 degrees, or an odd multiple of 45 degrees.) The polarizer 32 and analyzer 48 are, for example, polarizing optical fibers. If the presence of the analyzer is inconvenient then, as depicted in FIG. 12, it is readily replaced by a region of metal 35, e.g., aluminum or gold, overlying a portion of the thin film 30 (which is preferably etched to form a waveguiding strip, the magnitude of the shape linear birefringence associated with the strip being altered to achieve essentially zero net linear birefringence). The metal region 35 serves to absorb backward propagating light having a polarization transverse to that of the forward propagataing light exiting the polarization rotator 10. Preferably, the thickness of the metal region 35 ranges from about 0.01 micrometers ($\mu$m) to about 10 $\mu$m. Thicknesses less than about 0.01 $\mu$m are undesirable because the resulting films have undesirably low optical absorption. Thicknesses greater than about 10 $\mu$m, while not precluded, are less desirable because the resulting films do not yield greater optical absorption than thinner films, and require undesirably long fabrication times.

In operation, the analyzer 48 (or metal region 35) and thin film polarization rotator 10 serve to align the polarization of reflected (backward propagating) light substantially perpendicularly to the polarizer 32, thus precluding transmission to the optical source 20. If the source 20 is substantially unaffected by such perpendicularly aligned light, then the polarizer 32 need not be included.

Figure 13:
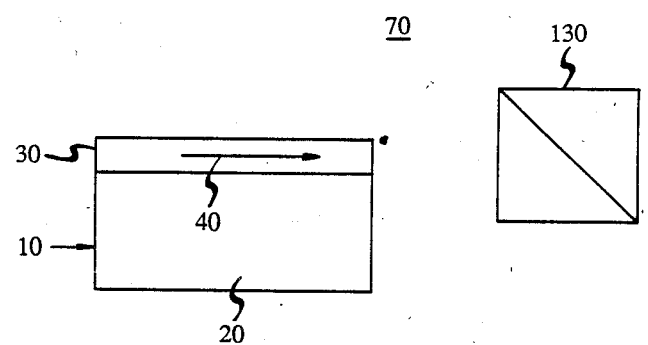

If the system component 70 is an optical circulator, then, as shown in FIG. 13, the circulator includes the thin film polarization rotator 10. In addition, the circulator includes means 130 for directing two light beams, having different polarizations, along two different optical paths, e.g., a polarization sensitive reflector or well-known functional equivalents such as a rutile plate or plates.

Figure 14:
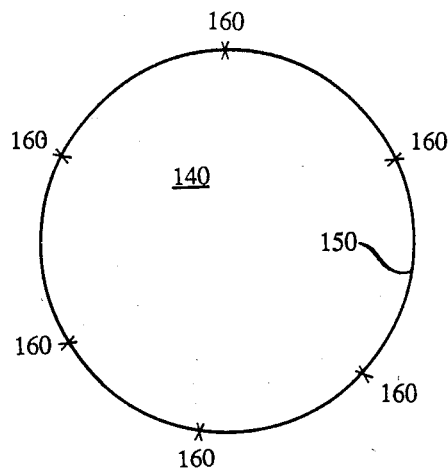
Figure 15:
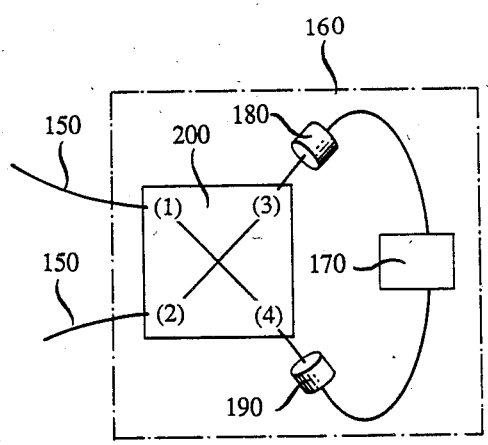

If the thin film polarization rotator 10 is as a component of an optical swithc, then, as depicted in FIGS. 14–15, the optical system 140 incorporating the switch is, for example, a local area network which includes an optical fiber 150 linking a plurality of work stations 160. As shown in FIG. 15, each such work station 160 includes, for example, a computer or computer terminal 170, which optically communicates with the optical fiber 150 (and thus with the other work stations) through a 2×2 optical switch 200. That is, each work station 160 includes an optical source 180, e.g., a semiconductor laser, which serves to transmit optical signals (bearing informaion coming from the computer or computer terminal) to the other work stations via the switch 200 and optical fiber 150. Each work station 160 also includs an optical detector 190, which receives opical signals propagating through the optical fiber 150 via the switch 200, the information contained in these signals being communicated to the computer or computer terminal 170.

Figure 1:
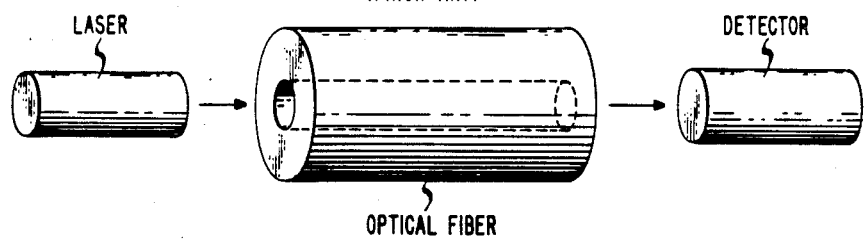
FIGS. 1 and 2 are, respectively, a schematic diagram of a conventional optical fiber communiccation system and a schematic diagram of a conventional optical mass storage device.
Figure 2:
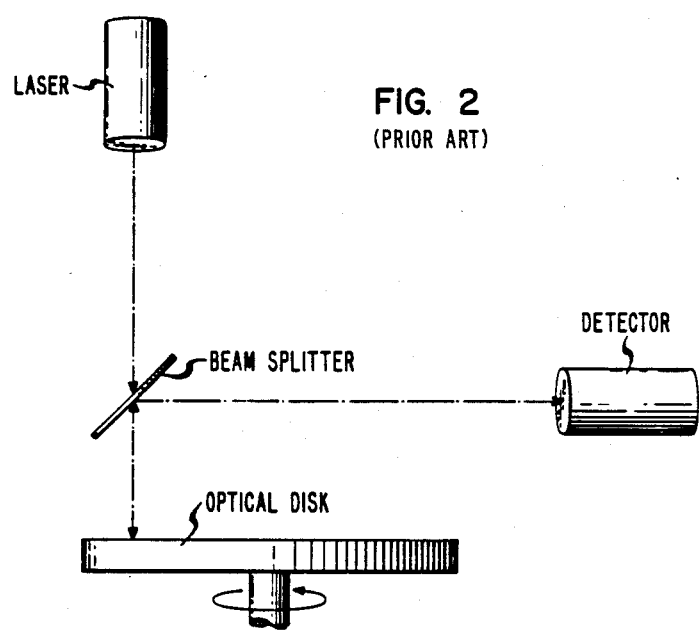
Figure 3:
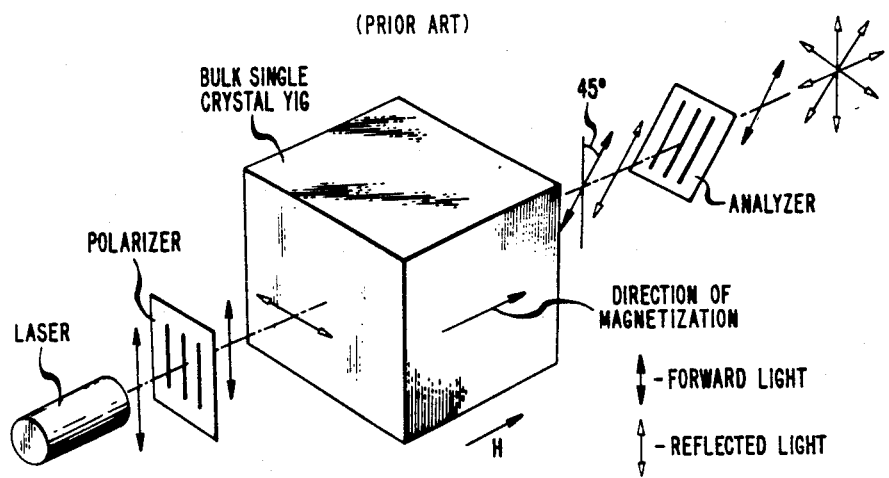
FIG. 3 is a schematic diagram of an optical system which includes a conventional, bulk single crystal magnetic garnet optical isolator.
Figure 16:
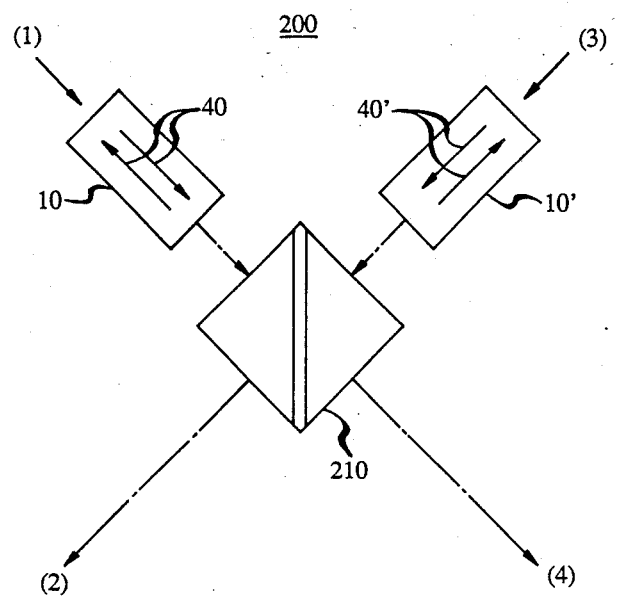
FIGS. 11, 12, 13, 15 and 16 depict devices, including thin film polarization rotators encompassed by the invention, incorporated into the inventive optical systems.
Figure 4:
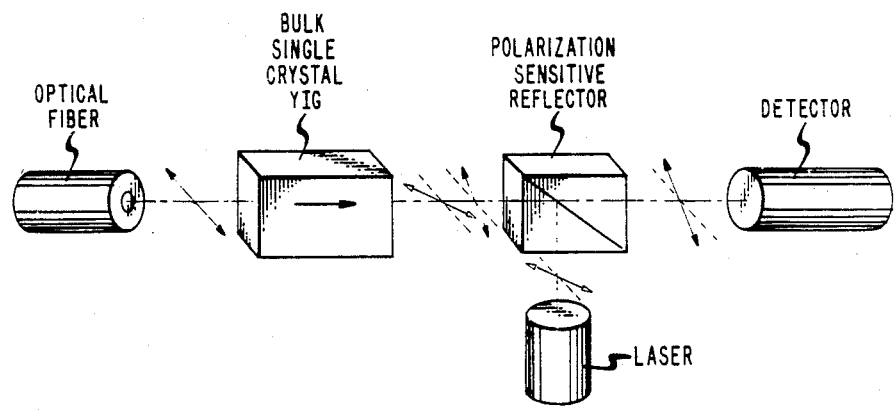
FIG. 4 is a schematic diagram of an optical system which includes a conventional, bulk single crystal magnetic garnet optical circulator.
Figure 5:
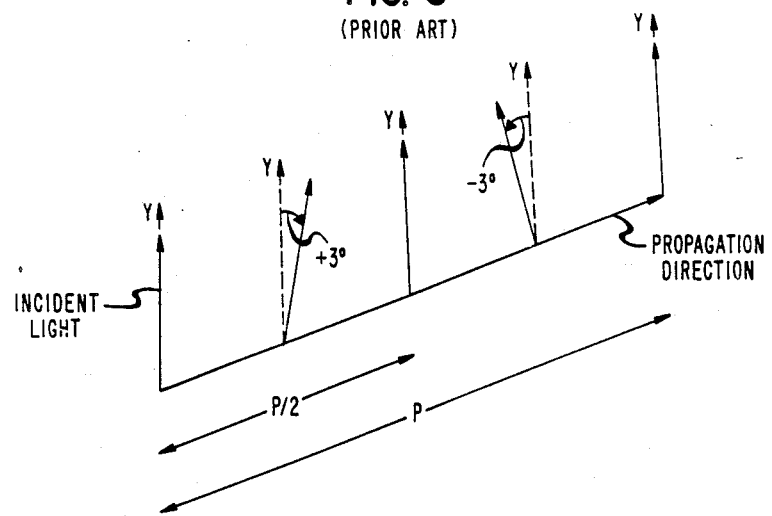
FIG. 5 depicts the oscicllatory rotation suffered by lifght in a magnetized, linearly birefringent medium.

A shown in FIG. 16, the 2×2 swich 200 includes two thin film polarization rotators 10 and 10, aligned perpendicularly with respect to each other. In addition, the switch 200 includes a polarization sensitive reflector 210 which is in optical communication with both rotators. Further, switch 200 includes input ports (1) and (3) through which optical signals are communicated from, respectively, the optical fiber 150 and optical source 180 to the switch 200. The switch 200 still further includes output ports (2) and (4) through which optical signals traversing the switch are communicated to, respectively, the optical fiber 150 and optical detector 190.

In operation, each switch 200 either permits, or precludes, optical communication (depending upon what is desired) between the corresponding work station and the optical fiber 150. That is, if communication is to be permitted, and if the optical signals entering the input port (1) from optical fiber 150 have their polarizations oriented at an angle of +45 degrees (relative to the plane of the thin film of the rotator 10), then the magnetization direction 40 of the rotator 10 should be aligned parallel to the propagation direction of the incoming light. Assuming the rotator 10 is of appropriate length, the polarization of the incident light will be rotated +45 degrees (to an orientation of +90 degrees) and, as a consequence, will be transmitted by the polarization sensitive reflector 210 to output port (4), and thus to optical detector 190. Similarly, if the optical signals generated by optical source 180 and entering the input port (3) have their polarizations oriented at an angle of −45 degrees, then the magnetization direcion 40' of the rotator 10 should also be aligned parallel to the propagation direction of incoming light. Again, assuming the rotator 10' is of appropriate length, the polarization of the incident light will be rotated +45 degrees (to an orientation of 0 degrees) and, as a consequence, will be transmitted by the polarization sensitive reflector 210 to output port (2), and thus to the optical fiber 150.

If communication is to be precluded, then the magnetizations of each of the rotators 10 and 10' should be an anatiparallel to the corresponding, incident light. That is, as a consequence, the polarization of the light incident on rotator 10 will be rotated −45 degrees (to an orienation of 0 degrees), and will thus be reflected to output port (2) by the polarizaion sensitive reflector 210. Similarly, the polarization of the light incident on rotator 10' will also be rotated −45 degrees (to an orientation of 90 degrees), and will thus be reflected to output port (4) by the polarization sensitive reflector 210.

I claim:

1. An optical system, comprising:
   a source of electromagnetic radiation;
   a component of said system, capable of optical communication with said source, serving to transmit or reflect at least a portion of the electromagnetic radiation emitted by said source; and
   a polarization rotator including a thin film optical waveguide, capable of optical communication with said source and said component, characterized in that
   said thin film waveguide exhibits essentially zero linear birefringence in the absence of an extremely applied stress in relation to at least one wavelength of incident, linearly polarized light of any polarization orientation.

2. The optical system of claim 1 wherein said optical system includes an optical isolator, said isolator including said polarization rotator.

3. The optical system of claim 1 wherein said optical system includes an optical circulator, said circulator including said polarization rotator.

4. The optical system of claim 1 wherein said optical system includes an optical switch, said switch including said polarization rotator.

5. The optical system of claim 1 wherein said thin film optica; waveguide includes material having a composition which includes iron and oxygen.

6. The optical system of claim 5 wherein said composition further includes yttrium.

7. The optical system of claim 5 wherein said composition further includes a rear earth element.

8. The optical system of claim 5 wherein said composition further includes bismuth.

9. An optical system, comprising:

a source of electromagnetic radiation; and a thin film waveguide capable of optical communication with said source, characterized in that said thin film waveguide exhibits essentially zero linear birefringence in the absence of an externally applied stress in relation to at least one wavelength of incident, linearly polarized light of any polarization orientation.

10. The optical system of claim 9, further comprising a detector of electromagnetic radiation, capable of optical communication with said waveguide.

11. A method for fabricating a device, comprising the steps of:

forming a thin film waveguide on a substrate, said waveguide exhibiting at least first and second components of linear birefringence, said first component being shape linear birefringence and said second component being of opposite sign to said first component, characterized in that said forming step includes the step of altering said first component until the algebraic sum of said at least first and second components in relation to at least one wavelength of light is essentially zero in the absence of an externally applied stress.

12. The method of claim 11 wherein said second component of linear birefringence includes stress-induced linear birefringence.

13. The method of claim 11 wherein said second component of linear birefringence includes growth-induced linear birefringence.

* * * * *

UNITED STATES PATENT AND TRADEMARK OFFICE
CERTIFICATE OF CORRECTION

PATENT NO. : 4,886,332

DATED : 12/12/89

INVENTOR(S) : Raymond Wolfe

It is certified that error appears in the above-identified patent and that said Letters Patent is hereby corrected as shown below:

Column 12, line 46, "extremely" should read --externally--.

Signed and Sealed this

Second Day of July, 1991

Attest:

HARRY F. MANBECK, JR.

*Attesting Officer*       *Commissioner of Patents and Trademarks*